Figure 1:
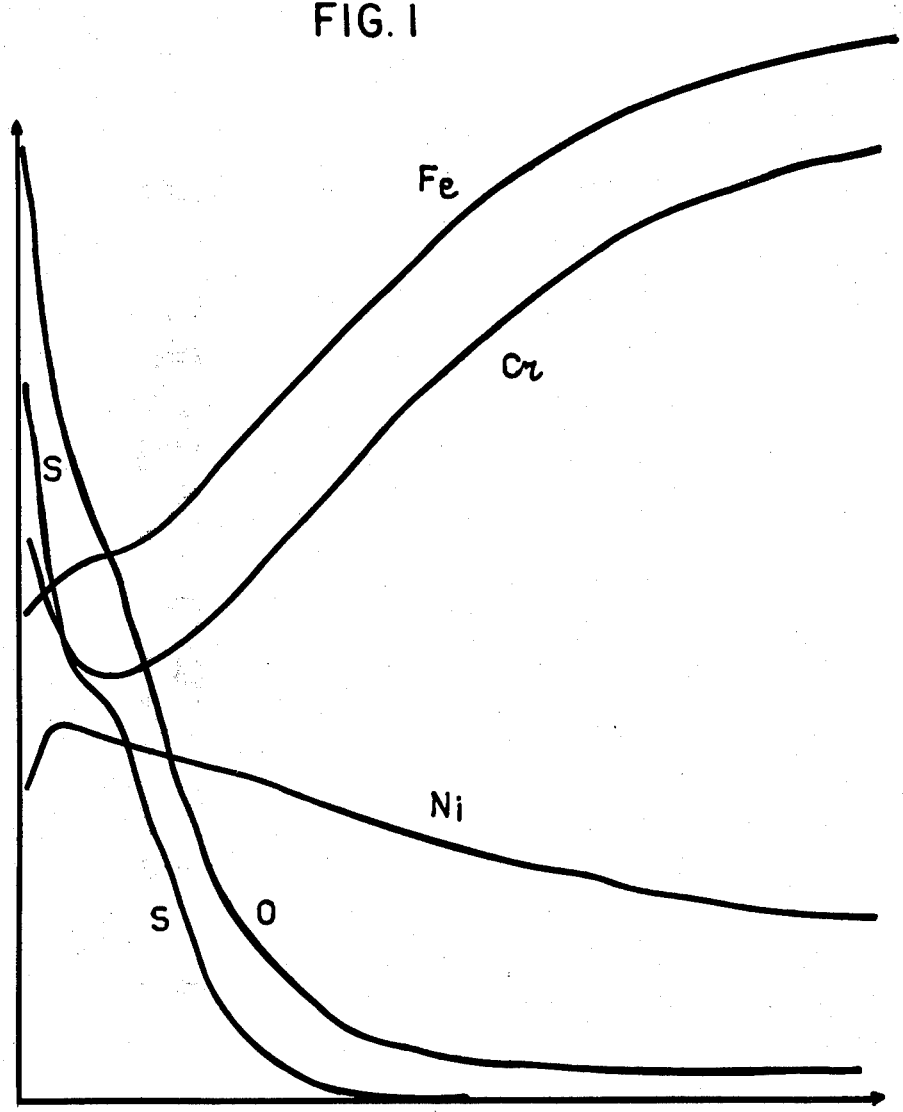

United States Patent [19]

Aries et al.

[11] 4,405,414
[45] Sep. 20, 1983

[54] PROCESS FOR MANUFACTURING A SELECTIVE ABSORBER OF A SOLAR COLLECTOR AND SELECTIVE ABSORBER SO OBTAINED

[75] Inventors: Lucien Ariès, Montgiscard; Jean-Pierre Traverse, Ramonville Saint Agne, both of France

[73] Assignee: Agence Nationale de Valorisation de La Recherche (A.N.V.A.R.), Paris Cedex, France

[21] Appl. No.: 328,135

[22] Filed: Dec. 7, 1981

Related U.S. Application Data

[63] Continuation-in-part of Ser. No. 167,042, Jul. 9, 1980, abandoned.

[30] Foreign Application Priority Data

Jul. 11, 1979 [FR] France ................... 79 18414

[51] Int. Cl.$^3$ ............................................. C25D 11/34
[52] U.S. Cl. ................................................. 204/56 R
[58] Field of Search ................. 204/56 R; 148/6.24, 148/6.21

[56] References Cited

U.S. PATENT DOCUMENTS 4,239,604 12/1980 Mahdjuri ............................. 126/901

Primary Examiner—R. L. Andrews
Attorney, Agent, or Firm—Shlesinger, Arkwright, Garvey & Fado

[57] ABSTRACT

The invention relates to a manufacturing process for a selective absorber for a collector panel of solar radiation with high absorption and low emissivity.

The process consists in making the collector panel of the absorber from an iron alloy containing in particular such a filler metal as chromium in the alloyed state and in subjecting said surface to an anodic oxidation in an acid electrolytic bath containing metalloid-based electrically active substances, in particular such sulfur based substances as sulfides.

The process of the invention allows making collector panels at low cost and with high selectivity without thereby incurring the danger of degrading said panels either at average or high temperatures.

15 Claims, 4 Drawing Figures

PROCESS FOR MANUFACTURING A SELECTIVE ABSORBER OF A SOLAR COLLECTOR AND SELECTIVE ABSORBER SO OBTAINED

This is a continuation-in-part of copending application Ser. No. 167,042 filed July 9, 1980, now abandoned.

The invention concerns a manufacturing process for a solar-collector selective-absorber whereby a solar-radiation collector panel with a high absorption and law emissivity is obtained, and applies to solar-radiation selective-absorbers so obtained.

Several types of processes are known, whereby the collector panel of a solar absorber is convered with a black coating to increase the absorption and possibly also to reduce the emissivity. One kind of presently used process consists in coating the panel with an appropriate paint, and as a rule, this method offers the advantage of cheap implementation, but on the other hand it does suffer from several drawbacks. In the first place, the collector panel is not selective, or is only slightly selective, that is, the emissivity is high, whereby much of the energy is lost by radiation, essentially in the infrared range. Furthermore, these coatings will degrade under average or high temperature conditions after some time in use.

Another type of process consists in cathodically depositing chromium oxides, termed chromium black, on the collector panel. The electrolytic bath is chromic-acid based and the deposition takes place in conventional electrolytic manner, namely adding material to the surface. This type suffers from the shortcoming of complexity and the cost of preparing the collector panel to be coated with chromium black. The panel first must be nickeled in order to achieve good adhesion by the coat of chromium black and to achieve satisfactory selectivity. It has also been observed furthermore that for a panel thusly coated, the absorption drops at average or high temperatures (beyond 200° C.).

Another type of process is illustrated for instance in French Pat. No. 2,325,002 wherein a stainless steel panel is treated chemically by dipping it when hot into complex baths containing chromium or lead based compounds to form oxide films.

This type of process suffers from the drawback that expensive and polluting baths must be used, and that the oxide surface layers formed must be rigorously controlled with respect to their thickness in order to achieve a selective effect. Further, their stability is unreliable at high temperatures.

Lastly a process is known (Swiss Pat. No. 576,008) to color a metal surface by high-voltage anodizing in a very basic medium and at high temperature. It is not known whether these coatings evince selective absorption properties for solar radiation. However, these colored steels are meant to be used at ordinary temperatures in order to achieve an ornamental effect, and their stability at higher temperatures is uncertain. Presumably, considering the anodizing conditions (basicity, high temperature high voltage), the coatings obtained in this process are similar to those obtained by hardening, and with the same shortcomings.

It is the purpose of the present invention to remedy the shortcomings of the known processes by making collector panels at a low cost and with excellent selectivity, without thereby degrading said panels.

Another object is to achieve absorbers with good corrosion resistance.

A further object is to achieve an absorber operable in high temperature ranges without significant reductions in selectivity.

To that end, the manufacturing process for a selective absorber of solar radiation in conformity with the invention resulting in a collector panel with high absorption and low emissivity comprises making such a collector panel from an iron alloy and subjecting this panel, in the presence of at least one filler metal other than iron, to an anodic oxidation in an electrolytic bath containing metalloid-based, electrically active substances. The electrolytic potential between the anode, which is the collector panel of the absorber, and the cathode is adjusted to such a value that the anode potential will be between the natural corrosion potential and the primary passivation potential of the iron alloy forming said anode. It is understood of course that the natural corrosion and the primary passivation potentials depend on the iron alloy immersed in the applicable electrolytic bath. These potentials are well-known to the skilled artisan and may be very easily measured. The natural corrosion potential may be ascertained for any alloy immersed in the particular medium using a voltmeter to measure the voltage naturally set up between a reference electrode and the alloy, both immersed in the particular bath.

The primary passivation potential can be ascertained by tracing the current/potential curve of the iron alloy in the electrolytic bath using a potentiostat (which applies a potential variable with respect to the reference electrode to the anode). The primary passivation potential corresponds to the peak of the activity spike. Preferably the filler metal(s) is (are) alloying element(s) of the iron alloy that constitute the collector panel. Advantageously chromium will be used as the filler metal for the iron alloy.

The metalloid-based electrically active bath substances contain atoms of sulfur, selenium or tellurium, and are electroactive on a level with these atoms which is to say that the substances are able to liberate these elements during anodic oxidation. They may also be released during electrolysis from mineral or organic substances contained in the bath. Such substances are hereinafter termed "electroactive substances."

In general, these electroactive substances contain the atoms of sulfur, selenium or tellurium at an oxidation state which is less than the maximum oxidation state of the atom. Thus sulfur, for example, may have a oxidation state varying from $-2$ to $+6$. Sulfates ($SO_4^{--}$) have the maximum oxidation state for sulfur, $+6$, and thus are incapable of liberating sulfur during oxidation. On the other hand, sulfides with an oxidation state of $-2$ are electroactive at the level of the sulfur atom during anodic oxidation.

Such an anodic oxidation or an iron alloy containing a filler metal in the alloyed state, particularly chromium, determines a modification in the chemical composition of the surface: this surface is enriched in filler metal coming from the core of the material and receives metalloid compounds from the electrolytic bath that migrate to the top over a given thickness. It will be noted that the surface acquires a black hue and experiments have shown that it acquires both high absorptivity and low emissivity. The collector panel thus obtained comprises no additional deposit, but is slightly transformed within the material itself over a skin depth. Therefore, there is no problem with respect to adhesion, while the stability of the compounds formed eliminates any danger of degradation.

The process is economical because little energy is used (relatively low electrolytic current and potential), because it can be implemented at the ambient temperature, uses economical electrolytic baths, and lastly because it requires no prior treatment of the surface at all except of course for the conventional preparations for anodic oxidation. In particular, the prior nickeling treatment required in the known chrome black processes is eliminated.

Furthermore, the (possibly very slightly) acid bath evinces no polluting feature at all that would be an obstacle in practice.

In a preferred embodiment, the collector panel is chosen to be of iron and chromium based stainless steel; an iron, chromium and nickel based alloy of the present type can be advantageously chosen. In this manner one obtains an improved selectivity due to a surface enrichment in nickel from a migration toward the surface of nickel atoms from the steel. Furthermore, the properties of stainless steel endow the absorber with a good corrosion resistance.

The type of stainless steel selected in each case depends on the operating temperature expected for the absorber and on the selectivity ratio desired. When operating at high temperatures, an iron, chromium and nickel based stainless steel may be used containing additions essentially of copper, silicon, titanium, molybdenum or niobium or a mixture of these metals. The selectivity and/or the stability are substantially improved by these additives.

It has been observed that the selectivity and/or the stability at high temperatures may be improved in most cases by using low-carbon steels (less than or equal to 0.03% by weight of carbon).

In order to precisely control the optical properties of the collector panel, the anodic oxidation preferably will be implemented with a regulated electrode potential by locating a reference electrode in the bath and by adjusting the potential differences between anode and reference electrode to a desired value which is very nearly constant and between the corrosion potential and the abovecited passivation potential. This control allows reproducibly adjusting the depth of penetration by the metalloid(s), the nature of the compounds formed and the thickness of the material affected by the migration of the additives inside the alloy, the optical properties of the surface depending on these parameters.

In particular the desired value cited above is set to a level close to that of the primary passivation potential.

In an embodiment offering good results, the electrically active bath substances are sulfur-based, in particular sulfides. It is observed in this case that a substantially higher absorption is obtained than for other metalloids, and a substantially lesser emissivity. These results no doubt are due to the formation at the surface of very advantageous compounds, namely the sulfides of chromium, of nickel, the oxy-sulfides of these substances or mixed sulfides (which are added to the oxides usually obtained by an anodic oxidation).

In the above-mentioned case of sulfur based electrically active substances, especially economic implementation conditions are achieved by carrying out the anodic oxidation in a treatment time of roughly between 5 and 30 minutes in an aqueous bath containing approximately 1 to 40% by weight of sulfuric acid and about 0.005 to 0.05 g of sulfur ions per liter.

It was observed there is wide acidity latitude and that practically it is enough to provide an aqueous bath containing at least 0.10% of acid to endow it with a sufficient permanent acidity and with at least 0.001 g of sulfur ions per liter to avert excessively long treatment times.

The anodic oxidation can be carried out at the ambient temperature in a suitably agitated medium.

In a further preferred embodiment, the electrolytic bath may contain a corrosion inhibitor which is specific for the metal of the collector. Particularly suitable corrosion inhibitors include acetylenic alcohols which are especially appropriate for stainless steels. One such corrosion inhibitor which has been found especially suitable is propiolic alcohol (also known as propargyl alcohol, $HCCCH_2OH$). It has been found that such corrosion inhibitors improve, in most cases, the optical properties of the surfaces, and especially provide an improved stability, notably in the presence of water.

The iron alloy of the collector panel may be in the form of sheet metal, tubing or other thick elements or also in the form of a foil mounted on a support.

The invention also covers a selective absorber of a solar panel manufactured by the method described above and comprising a black collector panel enriched at the surface by at least one filler metal other than iron, in particular chromium, and containing at its top boundary one or more metalloids, in particular sulfur and oxygen.

The process of the invention is illustrated below by several examples of embodiments described in relation to the drawings. In these drawings, FIGS. 1, 2, 3 and 4 are curves of the proportion of the elements at the top boundary of the material as a function of depth resp. for examples 1, 2, 3 and 4.

EXAMPLE 1

In this example, the absorber consists of stainless steel sheet metal ZO3CN18-10 (AFNOR standard) [composition: 18% chromium, 10% nickel, 0.03% carbon, remainder iron].

The electrolytic bath is an aqueous solution of sulfuric acid which is 38% by weight of acid, to which are added 0.013% g of sulfur per liter in the form of hydrated sodium sulfide $Na_2S.9H_2O$.

The corrosion potential of the above-cited steel in this bath is $-0.45$ volts and the primary passivation potential is $-0.17$ volts, a calomel electrode being taken as the reference electrode.

The cathode consists of the same type of stainless steel as the anode formed by the absorber sheet. The absorber is conventionally covered on all faces other than the collector panel likely to be irradiated for their protection.

A saturated calomel reference electrode is immersed into the bath.

The following are the treatment characteristics:
duration: 15 minutes
treatment potential (with respect to reference electrode): $-0.18$ volts
bath temperature: 20° C.

Following the treatment, the surface has a matte black appearance of which the absorption $\alpha_s$ (total absorbed radiation percentage with respect to the incident radiation) and the emissivity $\epsilon_{20}$ at 20° C. (total radiation emitted with respect to a blackbody at the same temperature) were measured as follows:

$\alpha_s=0.90$; $\epsilon_{20}=0.23$.

These values show good selectivity and a high absorption.

Thereupon an aging test at 200° C. was carried out on the absorber for 7,000 hours. At the end of that time, it was found that the absorption had significantly gone up to 0.93 and that the emissivity had slightly dropped to 0.21.

Therefore, in unexpected manner, the selectivity had improved with time.

Following the anodic oxidation, an ion probe microanalysis was carried out on a sample of the collector panel; the curves of FIG. 1 show the recordings obtained and illustrate the concentration profiles of the elements (be it observed it is not possible to scale the coordinate axes in a simple manner).

It is seen that there is sulfur and oxygen at the surface, and in increasing concentrations as the surface is approached. There is furthermore an enrichment near the surface in nickle and chromium. As regards the chromium, this enrichment appears to be due to a simple migration, considering the concentration trough in an intermediate zone between the surface and the inside. As regards the nickel, there is no trough as cited above, and the enrichment really can be explained by dissolution of a very thin layer of the material in the bath followed by diffusion of the nickel to the surface of the material.

EXAMPLE 2

This example was carried out using stainless steel Z 12 C N 25-20 (AFNOR standard) for the absorber, with a composition: 25% chromium, 20% nickel, 0.12% carbon, traces of silicon less than 1% and remainder iron.

The electrolytic bath is an aqueous solution of sulfuric acid with 38% by weight of acid, to which are added 0.027 g of sulfur per liter in the form of hydrated sodium sulfide.

In this bath, the corrosion potential is −0.40 volts and the passivation potential is −0.02 volts.

The treatment characteristics were as follows:
duration: 10 minutes
treatment potential: −0.05 volts
temperature: 20° C.

Figure 2:
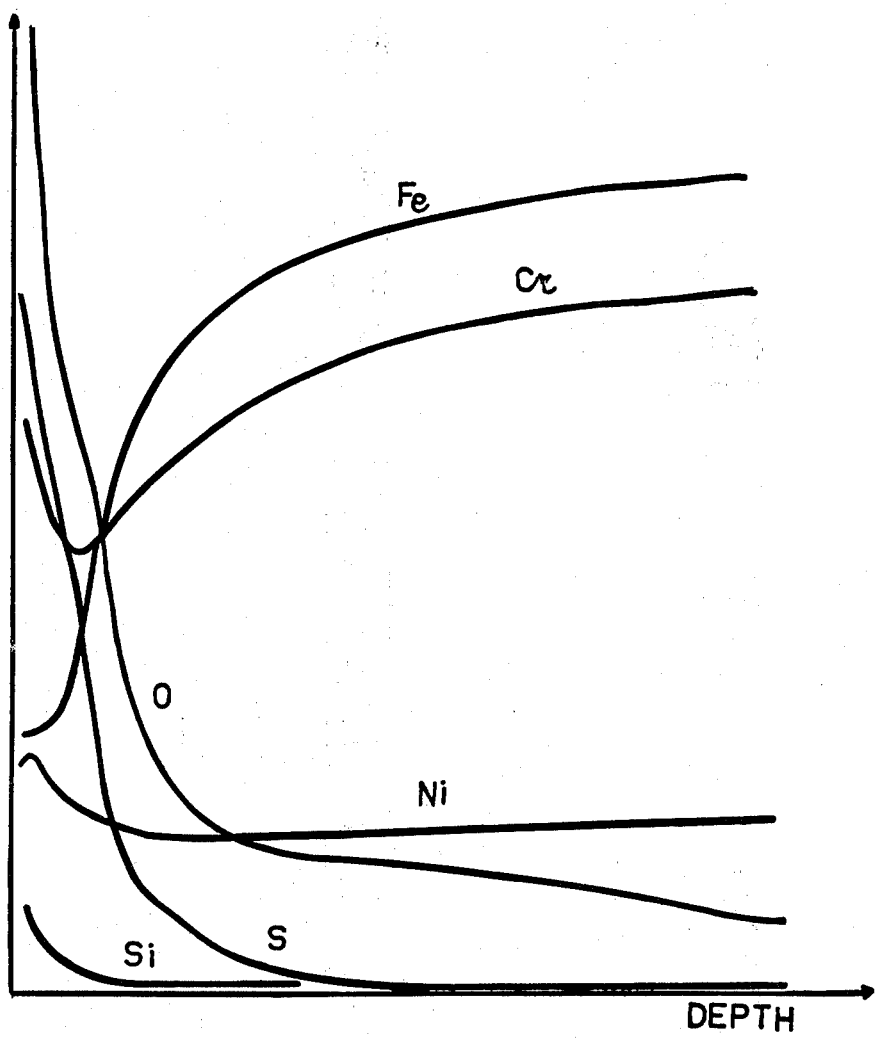

The curves obtained from ion microanalysis are shown in FIG. 2. There is an enrichment at the top boundary in silicon and enhanced selectivity ($\alpha_s=0.88$; $\epsilon_{20}=0.22$).

EXAMPLE 3

This example was carried out in a bath similar to the preceding one and using stainless steel Z 06 CNUD 15-04 (AFNOR standard) for the absorber, with a composition of 15% chromium, 4% nickel, 2% copper, 2% molybdenum, 0.06% carbon, remainder iron.

The corrosion potential is −0.41 volts and the passivation potential is −0.18 v.

The treatment characteristics are as follows:
duration: 10 minutes
treatment potential: −0.19 volts
temperature: 20° C.

Figure 3:
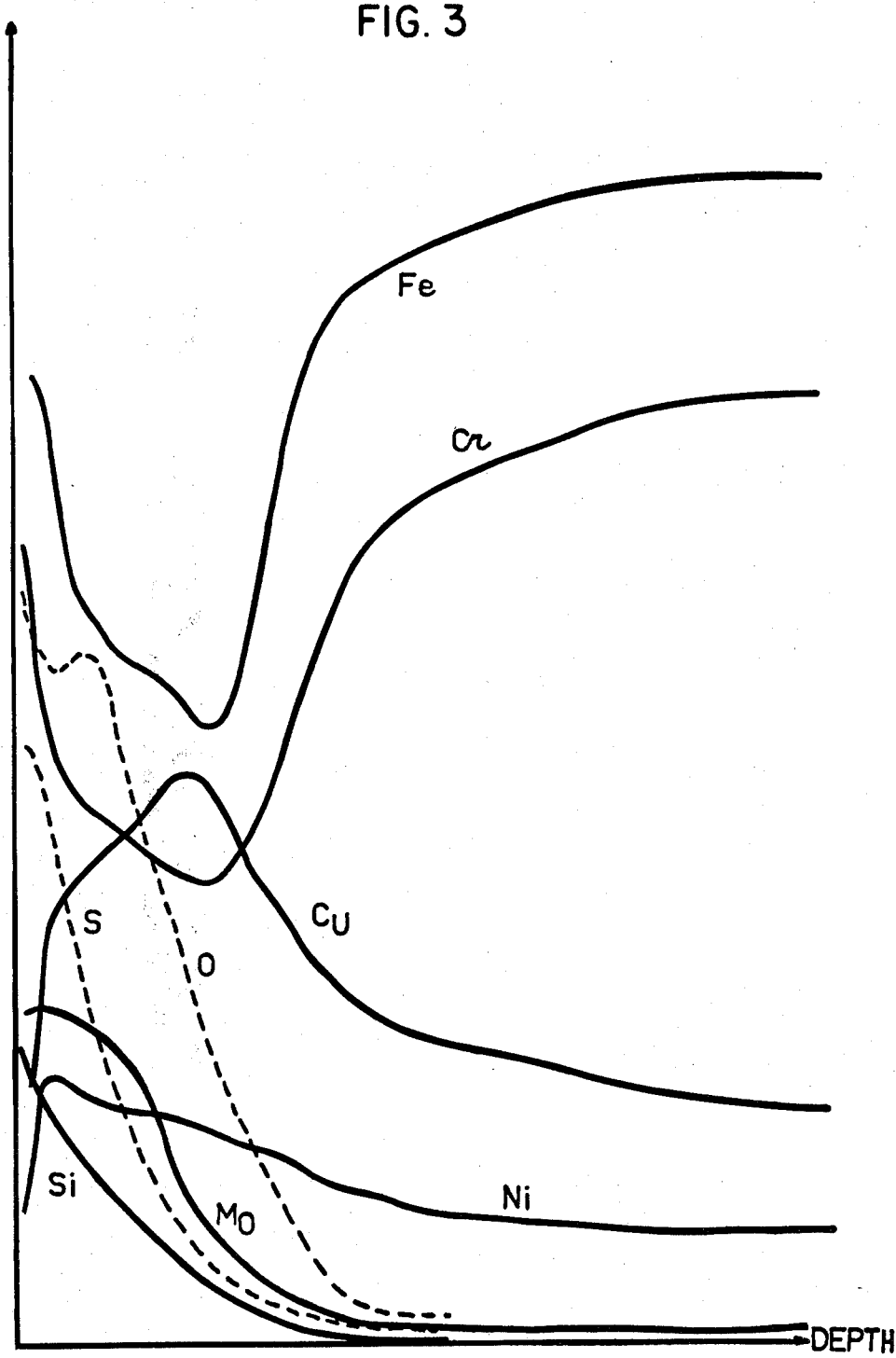

The curves that were obtained are shown in FIG. 3; the copper concentration shows a peak at the surface, the molybdenum concentration increasing as the surface is approached.

This example resulted in a receiving surface with an excellent selectivity ($\alpha_s=0.90$; $\epsilon_{20}=0.17$; however, the initial stainless steel is more costly than the previous ones.

EXAMPLE 4

In this example, the receiving surface is made in a foil 0.02 mm thick and of stainless steel Z 10 CNU 18-10, with a composition: 18% chromium, 10% nickel, 1-2% copper, a trace of silicon and remainder iron.

The electrolytic bath is an aqueous solution of sulfuric acid with 25% by weight of acid, to which is added 0.02 g of sulfur per liter in the form of hydrated sodium sulfide.

The corrosion potential of this steel is −0.42 and the activation potential is −0.10 v.

The cathode is made of the same stainless steel as the anode and the reference electrode is made of saturated calomel.

The treatment characteristics are as follows:
duration: 10 minutes
treatment potential: −0.18 v
temperature: 20° C.

Following treatment, the following values are obtained for absorption and emittivity:

$\alpha_s=0.83$; $\epsilon_{20}=0.15$.

In this case the emissivity is very low.

An aging test at 300° C. was carried out for 1,000 hours. There was a substantial increase in $\alpha_s$ which became 0.90. The emissivity $\epsilon_{20}$ slightly increased (0.17).

The selectivity of this receiving surface therefore is remarkable following the aging treatment.

Figure 4:
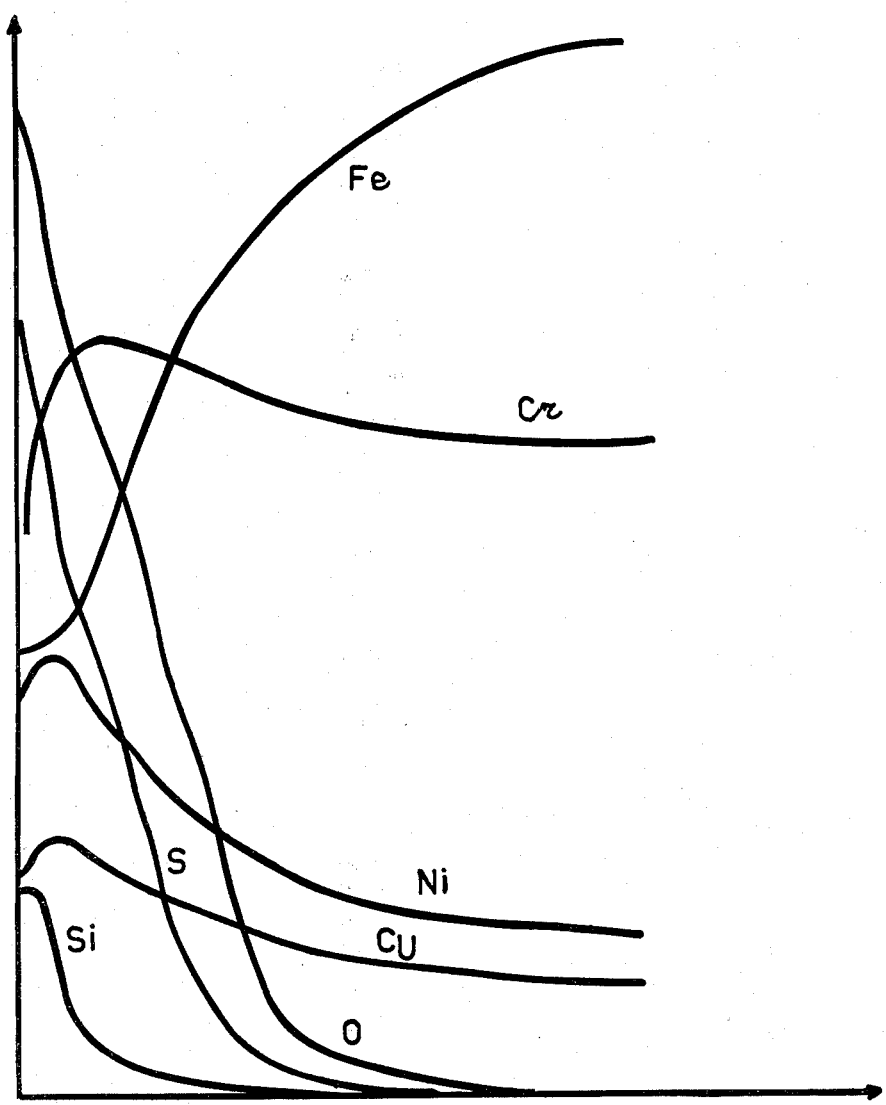

The curves obtained from ion microanalysis are shown in FIG. 4.

EXAMPLE 5

This example was carried out in a manner similar to Example 1 with the same steel (Z03 CN 18-10), but utilizing a different acid for the aqueous bath, particularly nitric acid at 1.4% by weight of acid, and with 0.013 g of sulfur in the form of hydrated sodium sulfide (Na$_2$S.9H$_2$)).

In this bath, the corrosion potential is −0.55 volts, and the passivation potential is −0.10 volts.

The following are the treatment characteristics:
duration: 10 minutes
treatment potential: −0.15 volts
bath temperature: 20° C.

After the treatment, there was obtained a collector's surface with a matte black appearance having the following characteristics:

$\alpha_s=0.90$; $\epsilon_{20}=0.20$

EXAMPLE 6

The process of Example 5 was repeated, but using hydrochloric acid under the following conditions:
aqueous bath: 1.2% by weight hydrochloric acid
corrosion potential of the bath: −0.45 volts
primary passivation potential: +0.10 volts
duration of treatment: 10 minutes
treatment potential: −0.05 volts
bath temperature: 20° C.

The resulting surface had the following characteristics:

$\alpha_s = 0.90$; $\epsilon_{20} = 0.20$

Examples 5 and 6 illustrate that the process of the present invention operates without significant influence based upon the type of acid used.

EXAMPLE 7

In this example, the absorber is produced on sheet steel Z8 C17 T (0.08% carbon, 17% chromium, 0.5% titanium).

The electrolytic bath is an aqueous solution of sulfuric acid at 7.3% by weight of acid, with 0.08 g of sulfur per liter added in the form of hydrated sodium thiosulfate $Na_2S_2O_3.5H_2O$.

The various parameters or characteristics of the process were the following:
- corrosion potential: −0.58 volts
- primary passivation potential: +0.30 volts
- treatment duration: 15 minutes
- bath temperature: 20° C.
- treatment potential: −0.40 volts
- absorption factor obtained: $\alpha_s = 0.90$
- emission factor: $\epsilon_{20} = 0.25$ This example shows that sulfur may be added by compositions other than sulfides. It is sufficient if the electroactive substance is capable of liberating sulfur atoms during the anodic oxidation.

It should be noted that sulfates would not permit the results to be obtained, since sulfur which is found in its maximum oxidation state in such compositions cannot be liberated and remains at the state of sulfate ions ($SO_4^{--}$) which is inactive in the anodic oxidation.

EXAMPLE 8

This example is analogous to Example 7 and is carried out under the same conditions on the same steel but with an electrolytic bath containing a further additive, a corrosion inhibitor, which in this example is propiolic alcohol at a concentration of 0.03% by weight per liter of bath.

It will be noted that the optical characteristics of the absorber are clearly improved by the addition of this inhibitor.

$\alpha_s = 0.93$; $\epsilon_{20} = 0.19$

Moreover, while the absorber treated in the preceding example obtained a resistance to normal corrosion, that of the present example obtained with the corrosion inhibitor achieved an exceptional stability. No alteration was apparent after remaining in the water for 1,000 hours.

EXAMPLE 9

In this example, the absorber is produced on stainless steel sheet, Z 03 CN 18-10.

The electrolytic bath is a aqueous solution of sulfuric acid at 1.8% by weight of acid, with 0.03 g of sulfur per liter added in the form of hydrated sodium thiosulfate.

The various parameters or characteristics obtained were as follows:
- corrosion potential: −0.48 volts
- primary passivation potential: −0.15 volts
- treatment duration: 10 minutes
- treatment potential: −0.40 volts
- bath temperature: 20° C.
- absorption factor obtained: $\alpha_2 = 0.91$
- emission factor: $\epsilon_{20} = 0.20$ This example demonstrates that the strength of acid in the bath may be selected over a large range.

EXAMPLE 10

In this example, the absorber is obtained from ferritic steel sheet, Z 08 C 17 T.

The electrolytic bath is an aqueous solution of sulfuric acid at 1.8% acid by weight, with 0.017 g of sulfur added per liter in the form of sodium sulfide.

The various parameters or characteristics obtained were as follows:
- corrosion potential: −0.61 volts
- primary passivation potential: +0.05 volts
- duration of treatment: 10 minutes
- bath temperature: 25° C.
- treatment potential: −0.30 volts
- absorption factor obtained: $\alpha_s = 0.85$
- emission factor: $\epsilon_{20} = 0.19$

EXAMPLE 11

This example was carried out under the same conditions as the preceding example, Example 10, but with the addition to the bath of 0.01% by weight of propiolic alcohol.

The various parameters or characteristics were as follows:
- corrosion potential: −0.60 volts
- primary passivation potential: −0.07 volts
- duration of treatment: 10 minutes
- bath temperature: 25° C.
- treatment potential: −0.30 volts
- absorption factor obtained: $\alpha_2 = 0.92$
- emission factor: $\epsilon_{20} = 0.16$ The results were clearly improved by the presence of the corrosion inhibitor, propiolic alcohol. No alteration was apparent after remaining in water for 1,000 hours.

EXAMPLE 12

In this example, the absorber is produced on stainless steel sheet Z 03 CN 18-10.

The electrolytic bath is an aqueous solution of sulfuric acid at 1.8% by weight, with the addition of 0.03 g of selenium per liter in the form of selenious anhydride ($SeO_2$).

The characteristics and performance were as follows:
- corrosion potential: −0.35 volts
- primary passivation potential: −0.15 volts
- treatment duration: 15 minutes
- bath temperature: 20° C.
- treatment potential: −0.30 volts
- absorption factor obtained: $\alpha_s = 0.91$
- emission factor: $\epsilon_{20} = 0.15$ It should be noted, that as for sulfur, a bath based on a metalloid from the same column of the periodic table as sulfur also gives good results.

EXAMPLE 13

The same example as the preceding, Example 12, was carried out but using an addition to the bath of 0.96 g of tellurium per liter in the form of tellurium dioxide ($TeO_2$).

The characteristics and performances were the following:
- corrosion potential: −0.36 volts
- primary passivation potential: +0.34 volts
- treatment duration: 10 minutes
- bath temperature: 20° C.
- treatment potential: −0.10 volts absorption factor obtained: $\alpha_s = 0.90$ emission factor: $\epsilon_{20} = 0.25$ The tellurium utilized as the electroactive substance gives equally good results.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

We claim:

1. A process for producing a selective absorber for a solar collector panel having high absorption and low emissivity comprising providing a panel formed from an alloy of iron and at least one filler metal, comprising chromium alloyed with said iron, subjecting said panel as an anode to anodic oxidation in an acidic electrolytic bath containing at lest one electroactive substance containing atoms selected from the group consisting of sulfur, selenium and tellurium, the electrolytic potential between the anode and the cathode being set to such a value that the anode potential will be between the natural corrosion potential and the primary passivation potential of the alloy forming said panel.

2. A process as in claim 1, wherein said panel comprises a stainless steel.

3. A process as in claim 2, wherein the collector panel is made from stainless steel containing iron, chromium and nickel.

4. A process as in claim 2 and wherein the collector panel is made from stainless steel also containing at least one metal selected from the group consisting of copper, silicon, titanium, molybdenum or niobium.

5. A process as in claim 1, characterized in that the collector panel is made from an iron alloy with a low carbon content.

6. A process as in claim 1, characterized in that the collector panel is made from an iron alloy with a low carbon content.

7. A process as in claim 1 or 2 and including carrying out the anodic oxidation of said panel in said bath using a reference electrode in such bath, and setting the potential between said panel and said reference electrode at a substantially constant value between the natural corrosion potential and the primary passivation potential of said alloy.

8. A process as in claim 7, characterized in that the desired value of the potential difference is adjusted to a value close to the primary passivation potential of the iron alloy.

9. A process as in claim 1, 2 or 6 and, wherein said electroactive substance is a sulfide.

10. A process as in claim 9, characterized in that said bath contains at least 0.010% by weight of acid and at least 0.001 g of sulfur ions per liter.

11. A process as in claim 9, characterized in that the anodic oxidation is carried out within a treatment time of between about 5 and about 30 minutes in an aqueous bath containing roughly between 1% and 40% by weight of sulfuric acid between 0.005 and 0.5 g of sulfur ions per liter.

12. A process as in claim 1 and, wherein said bath includes a corrosion inhibitor for said alloy.

13. A process as in claim 12 and, wherein said corrosion inhibitor comprises an acetylenic alcohol.

14. A process as in claim 13 and, wherein said corrosion inhibitor comprises propiolic alcohol.

15. A selective absorber for a solar collector produced by the process of claim 1, 2, 3, 6 or 13.

* * * * *